(12) United States Patent
Zehfuss et al.

(10) Patent No.: US 9,630,642 B2
(45) Date of Patent: Apr. 25, 2017

(54) BABY STROLLER

(71) Applicant: Baby Jogger, LLC, Richmond, VA (US)

(72) Inventors: Mark Zehfuss, Richmond, VA (US); Jordi Dorca, Sant Joan de les Abadesses (ES)

(73) Assignee: Baby Jogger LLC, Richmond, VA (US)

( * ) Notice: Subject to any disclaimer, the term of this patent is extended or adjusted under 35 U.S.C. 154(b) by 0 days.

(21) Appl. No.: 14/825,525

(22) Filed: Aug. 13, 2015

(65) Prior Publication Data

US 2016/0046314 A1    Feb. 18, 2016

Related U.S. Application Data

(60) Provisional application No. 62/037,432, filed on Aug. 14, 2014.

(51) Int. Cl.
*B62B 7/06* (2006.01)
*B62B 9/10* (2006.01)

(52) U.S. Cl.
CPC ............. *B62B 9/104* (2013.01); *B62B 9/102* (2013.01)

(58) Field of Classification Search
CPC ......... B62B 9/102; B62B 9/104; B62B 7/004; A61G 5/1067
See application file for complete search history.

(56) References Cited

U.S. PATENT DOCUMENTS

| | | | |
|---|---|---|---|
| 4,479,665 A | 10/1984 | Kassai | |
| 6,086,087 A | 7/2000 | Yang | |
| 6,322,097 B1 | 11/2001 | Lan | |
| 6,530,591 B2 | 3/2003 | Huang | |
| 6,880,850 B2 | 4/2005 | Hsia | |
| 7,832,744 B2 | 11/2010 | Chen et al. | |
| 8,366,127 B2 | 2/2013 | Zhong et al. | |
| 8,550,479 B2 | 10/2013 | Yi et al. | |
| 2003/0030252 A1 | 2/2003 | Huang | |
| 2003/0132611 A1 | 7/2003 | Yoshie et al. | |
| 2004/0245747 A1 | 12/2004 | Hsia | |
| 2005/0242547 A1 | 11/2005 | Chen | |
| 2009/0039620 A1 | 2/2009 | Ryan et al. | |

(Continued)

FOREIGN PATENT DOCUMENTS

| | | |
|---|---|---|
| CN | 2389094 Y | 7/2000 |
| CN | 2393775 Y | 8/2000 |

(Continued)

OTHER PUBLICATIONS

Li, Qing, International Search Report for International Patent Application No. PCT/CN2011/084797, Apr. 12, 2012, 2 pages.

*Primary Examiner* — Bryan Evans

(74) *Attorney, Agent, or Firm* — Eversheds Sutherland (US) LLP

(57) ABSTRACT

Baby strollers may have a reversible seat backrest assembly such that the seat may be transferred from a forward facing position or a rearward facing position. Both the forward facing position and the rearward facing position may have a plurality of reclining angle for the comfort of the child. The seatback rest assembly may have a slider crank assembly including two connecting rods to allow adjustment of the seatback rest into the plurality of locked positions.

17 Claims, 13 Drawing Sheets

(56) References Cited

U.S. PATENT DOCUMENTS

| | | | |
|---|---|---|---|
| 2011/0068549 A1 | 3/2011 | Chen | |
| 2011/0148168 A1 | 6/2011 | Chen | |
| 2012/0025491 A1* | 2/2012 | Li | B62B 7/083 280/642 |
| 2013/0328356 A1* | 12/2013 | Dorca | B62B 9/102 297/94 |

FOREIGN PATENT DOCUMENTS

| | | |
|---|---|---|
| CN | 2758147 Y | 2/2006 |
| CN | 100410121 C | 8/2008 |
| CN | 102060046 A | 5/2011 |
| CN | 201907548 U | 7/2011 |
| EP | 2178735 B1 | 1/2011 |
| FR | 2798349 A1 | 3/2001 |
| WO | 02/20330 A1 | 3/2002 |

\* cited by examiner

BABY STROLLER

RELATED APPLICATIONS

This patent application claims priority under 35 USC §110 to U.S. Provisional Patent Application No. 62/037,432 filed on Aug. 14, 2014.

FIELD OF THE INVENTION

This specification is directed to baby strollers. More specifically to baby strollers having a reversible seat assembly. Embodiments of the stroller comprise a seat backrest connected to the reversible seat assembly that may be adjusted between and secured in a plurality of reclining positions. The plurality of positions include positions wherein the reversible seat backrest is angled backward for a child to have a forward facing position in the stroller and positions with the seat backrest angled forward for a child to have a rearward facing position in the stroller in the forward facing position, the child can rest on the front side of the seat backrest and in the rearward facing position wherein the child can rest on the back side of the seat backrest.

BACKGROUND

Many strollers have seats that may only be attached to a stroller in the forward facing position. In the forward facing position, a child sitting in the stroller looks straight ahead in the direction of travel of the stroller. This position is most common and gives the child the best view of the where the child is headed. However, at times, the child in the stroller and the user of stroller may wish to more easily see each other, especially with very young children. Therefore, some strollers have seats that face in the rearward facing position or comprise reversible seat that may be attached in either the forward facing position or the rearward facing position.

However, such strollers can be difficult to manipulate and fold for storage. To switch positions the seat must be disconnected from the stroller and reattached in the desired orientation. Another disadvantage with some strollers having reversible seats is that the stroller frame can only be folded with the seat is removed. Other strollers have overcome this limitation, however these strollers may only be folded with the seat attached in one orientation and may not fold compactly.

There is a need for a stroller with a seat comprising a reversible backrest such that the seat adjusted and secured such that a child will be in either the forward facing position or the rearward facing position. There is an additional need for a stroller comprising a reversible backrest such that the seat may be locked in either the forward facing position or the rearward facing position that may also be folded compactly.

SUMMARY

In one embodiment, a stroller comprises a stroller frame with a reversible backrest. The stroller frame comprises a handle frame, a rear wheel support frame, a front wheel support frame and a seat backrest support frame. The handle frame, rear wheel support frame and front wheel frame rotate about a pivot defining a pivot axis. Further, the backrest support frame is rotatably connected to rotate about the same pivot axis from a position wherein the child seat is in a forward facing position to a second position wherein the child seat is in a rearward facing position.

The above embodiment and other embodiments may comprise a backrest support assembly. The seat backrest support assembly comprises a seat backrest frame and a backrest locking mechanism to secure the backrest support frame in various reclining and directional positions. The backrest locking mechanism may comprise a plurality of locking stops and a locking member moveable from a locked position wherein the locking member engages one of the locking stops to an unlocked position wherein the locking member does not engage a stop. Embodiments of the backrest locking mechanism include a slider crank assembly that includes two connecting rods and sliding components. One connecting rod and sliding component is capable of moving the locking member into the locking position when the backrest support frame is in the forward facing position and the other connecting rod and sliding component is capable of moving the locking member into the locking position when the backrest support frame is in the rearward facing position.

Aspects of the stroller, double stroller and attachment are presented in various embodiments, however one skilled in the art will understand various variation and interchangeability of the components of the various embodiments which are intended to be included in the scope of the invention.

DESCRIPTION

Strollers comprise a seat for holding a child while the parent or guardian conveniently pushes the stroller on its wheels. Typically, strollers have a seat that only has forward facing seat position with a seat back comprising multiple reclining positions from laying back to slightly angled backward. Other strollers include a forward facing seat that may be removed from the stroller frame and rotated 180° and then reconnected in a rearward facing position so the child may face the parent or guardian as they push the stroller from the rear by the handle. Additionally, other strollers comprise a reversible seat backrest with a first seat in front of the seat backrest and a second seat behind the seat backrest such that the stroller may be used as either a forward facing stroller or a rearward facing stroller. Various folding mechanisms have been used in an attempt to compactly fold such strollers.

In a typical conventional stroller, the handle frame supports a handle grip and also provides support for a fabric seat back. For example, fabric of the seat backrest is attached to the handle frame tubes. However, for a stroller with a reversible seat back, the stroller will have a handle frame and a seatback frame, wherein the seatback frame supports the seat backrest and may be moved relative to the handle frame. The seatback frame should be adjusted relative to the handle frame such that the child rests on the front of the seat backrest in the forward facing position and the back side of the seat backrest in the rearward facing position.

Figure 11:
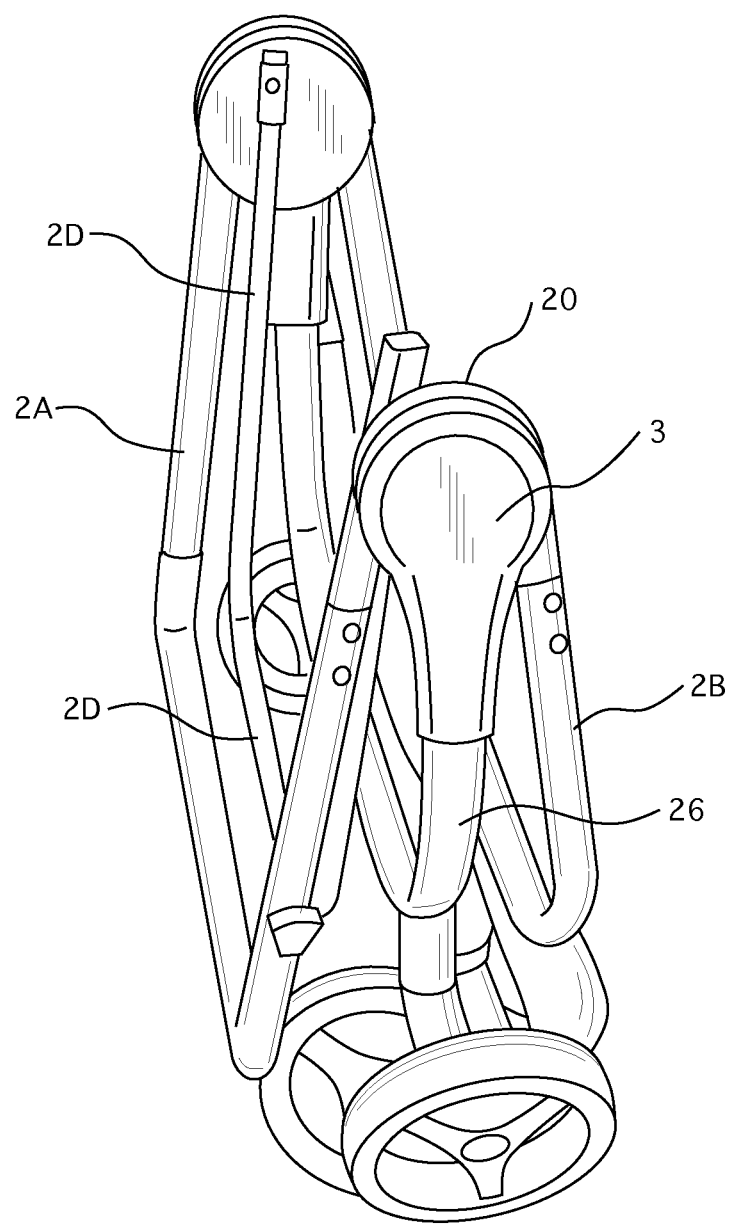
FIG. 11 depicts the embodiment of the stroller of FIG. 1 in the folded storage configuration.

Since the stroller now comprises four major frame members, the handle frame, front wheel support frame, rear wheel support frame, and the seat back frame, embodiments of the stroller frame may comprise a folding mechanism that coordinates rotation of all four major frame members from the folded position to the unfolded position. Therefore, embodiments of the stroller comprise a folding mechanism that rotates the reversible seat backrest with the other frame members to a compact folded configuration. For example, the compact folded configuration may have all the major frame members substantially parallel to each other (as shown in FIG. 11).

In the unfolded in-use configuration, the seatback frame may have a plurality of positions including positions with the seat back angled backward for the child to have a forward facing position and positions with the seat back angled forward for a child to have a rearward facing position.

In one embodiment, the stroller comprises a seat backrest frame positioning assembly comprising a rotatable seat backrest bracket with a plurality of seat back positioning notches. The rotatable seat backrest bracket is rotatably connected the seat frame or the stroller folding mechanism. In an embodiment in FIGS. 3 to 10, the rotatable seat backrest bracket is rotatably connected to the stroller folding mechanism.

In this embodiment, the stroller folding mechanism comprises a first rotatable member and a second rotatable member. The first rotatable member is connected to a handle member, the second rotatable member connected to a front wheel frame member and the folding mechanism is connected to the rear wheel frame member. In other embodiments, the first rotatable member may be connected to one of a front wheel frame member, a rear wheel frame member, a handle frame member or a seat back frame member and the second rotatable member connected to a different one of the front wheel frame member, the rear wheel frame member, the handle frame member or the seat back frame member.

Figure 1:
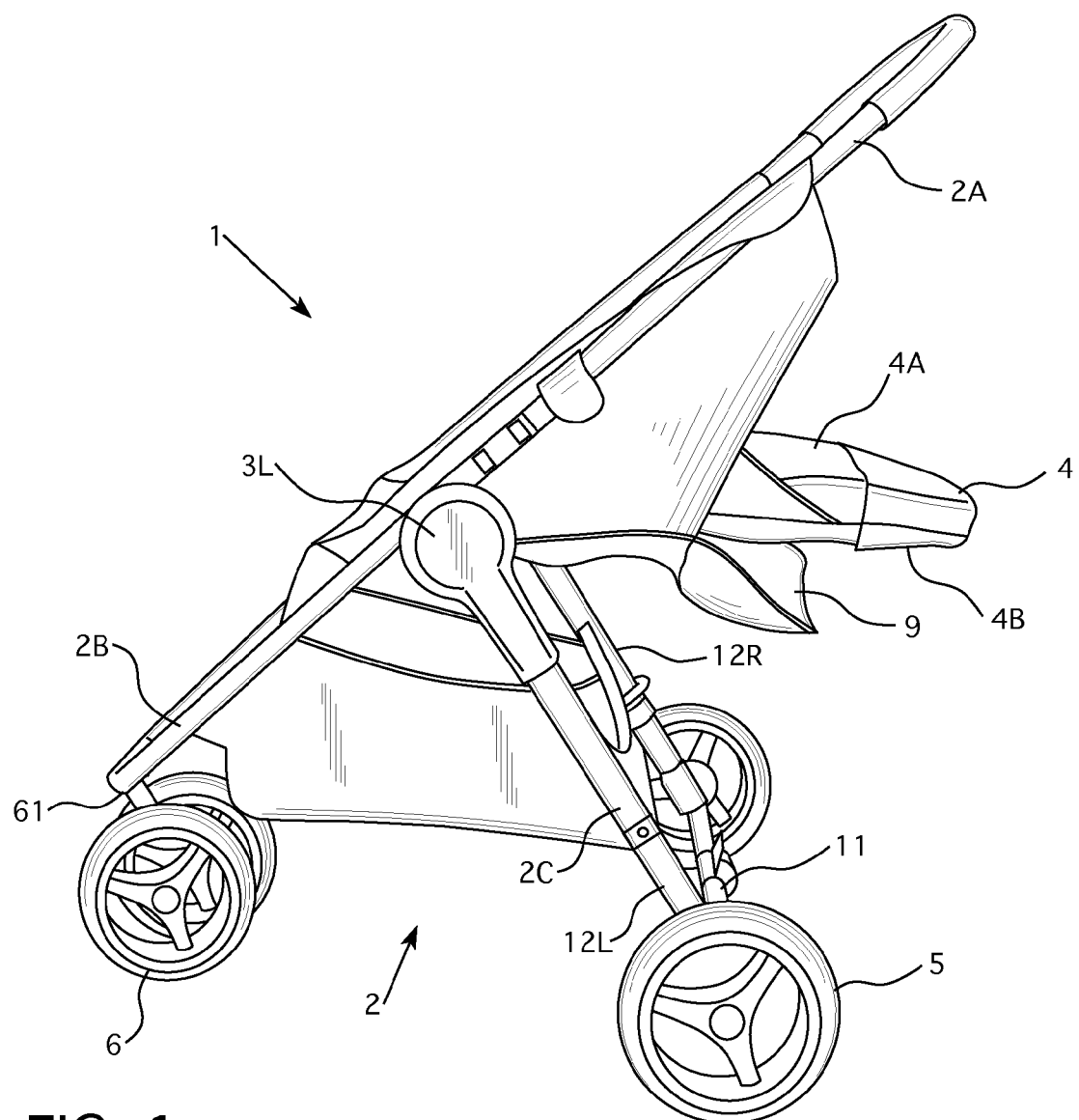
FIG. 1 depicts an embodiment of a stroller having a handle frame 2A, a front wheel frame 2B, a rear wheel support frame 2C, and a reversible seat back frame 2D with the reversible seat back frame in the forward facing position, wherein the stroller further comprises a folding mechanism and a seat backrest locking mechanism and the handle frame, the front wheel frame, the rear wheel support frame, and the reversible seat back frame are all capable of rotating about the same axis of rotation during folding or adjustment of the position of the reversible seatback frame.

As an example, an embodiment of a stroller comprising a reversible seat back is shown in FIG. 1. The stroller 1 comprises a stroller frame 2 and a reversible seat backrest 4. The reversible seat backrest 4 comprises forward facing seat back surface 4A and rearward facing seat back surface 4B. The stroller frame 2 further comprises a handle frame 2A. The handle frame 2A may be a U-shaped frame member as shown, two separate frame members as is known in the art, typically for umbrella strollers, other handle design. The handle frame 2A may also include a handle frame articulating joint or a telescoping section (not shown) to raise or lower the height of the handle portion to a comfortable height for the user or for compact storage.

The stroller frame 2 also includes a front wheel support frame 2B. In this embodiment, the front wheel support frame comprises a swivel wheel support 61 and a set of front swivel wheels 6. The front wheels 6 are rotatably connected to the swivel connected to the swivel wheel supports 61. The stroller frame 2 still further comprises a rear wheel support frame 2C. The rear wheel support frame 2C comprises a support frame 11 extending between a left rear leg 12L and a right rear leg 12R. The left rear leg 12L is rotatably connected to a left, rear wheel 5L and right rear leg 12R is rotatably connected to right rear wheel 5R.

Figure 4:
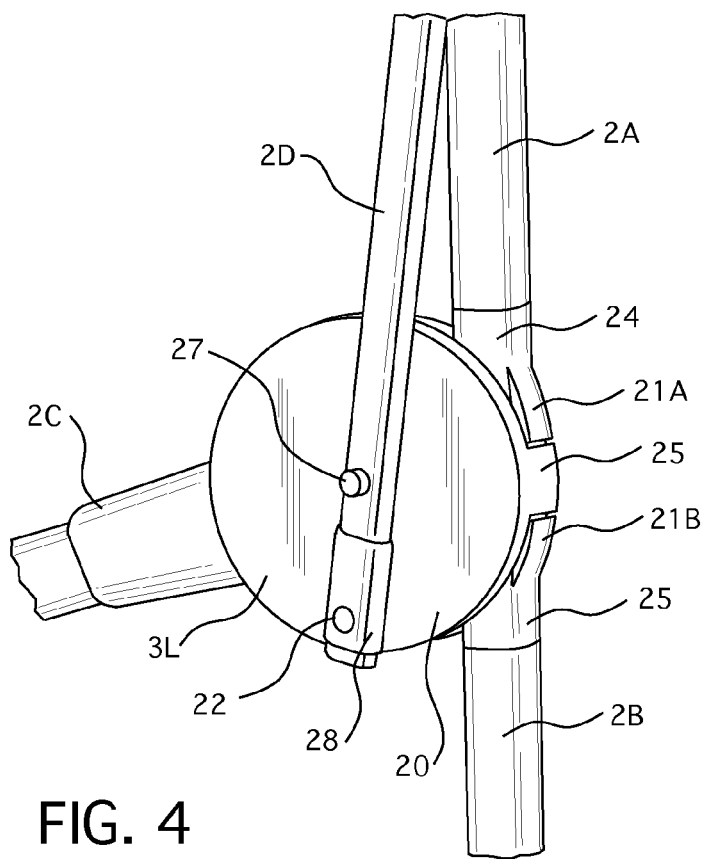
FIG. 4 depicts an enlarged interior view of the folding mechanism of the embodiment of the stroller of FIG. 3 showing the connection of the reversible seat back frame.
Figure 5:
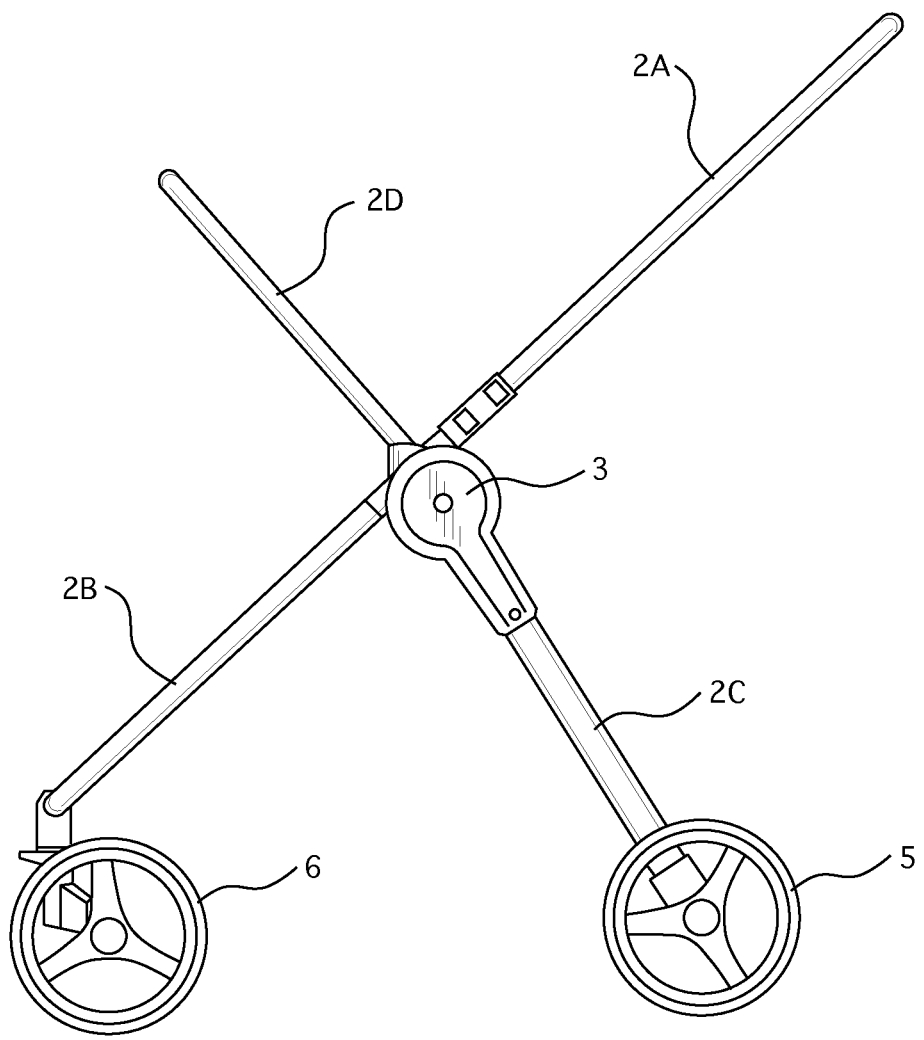
FIG. 5 depicts an side view of the stroller frame of an embodiment of the stroller having a handle frame 2A, a front wheel frame 2B, a rear wheel support frame 2C, and a reversible seat back frame 2D.
Figure 6:
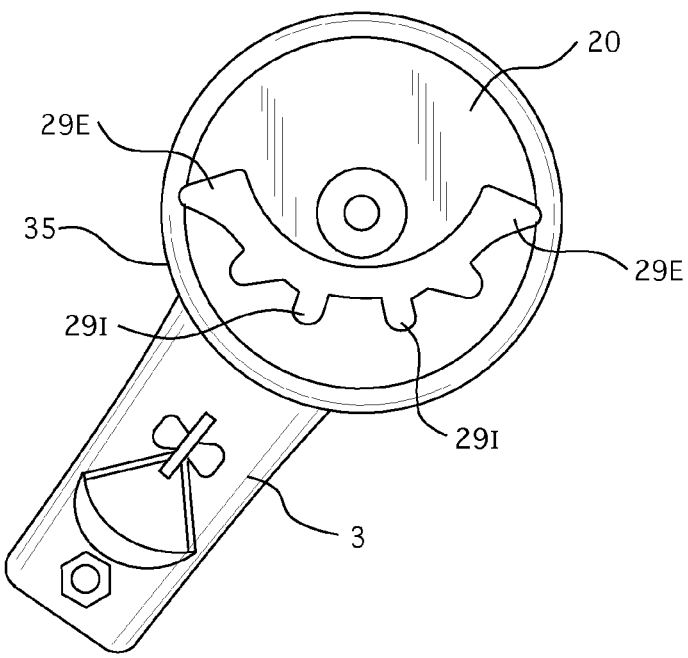
FIG. 6 depicts an interior view of an embodiment of a rotatable seat back bracket with a plurality of seat back positioning notches.

The stroller frame 2 further comprises a seat backrest frame 2D (see FIGS. 4 and 5, for example). The seat back frame 2D comprises a positioning assembly that allows the seat back 4 to be positioned in the forward facing position (as shown in FIG. 1). In the forward facing position, a child may rest his back on the front seat backrest surface 4A. As shown, the stroller seat backrest 4 is shown in a low reclining position that allows the child to be down in the forward facing position. On the forward facing position of the seat backrest 4, the rearward facing foot rest 9 is under the seat backrest 4 and not used by the child.

Figure 2:
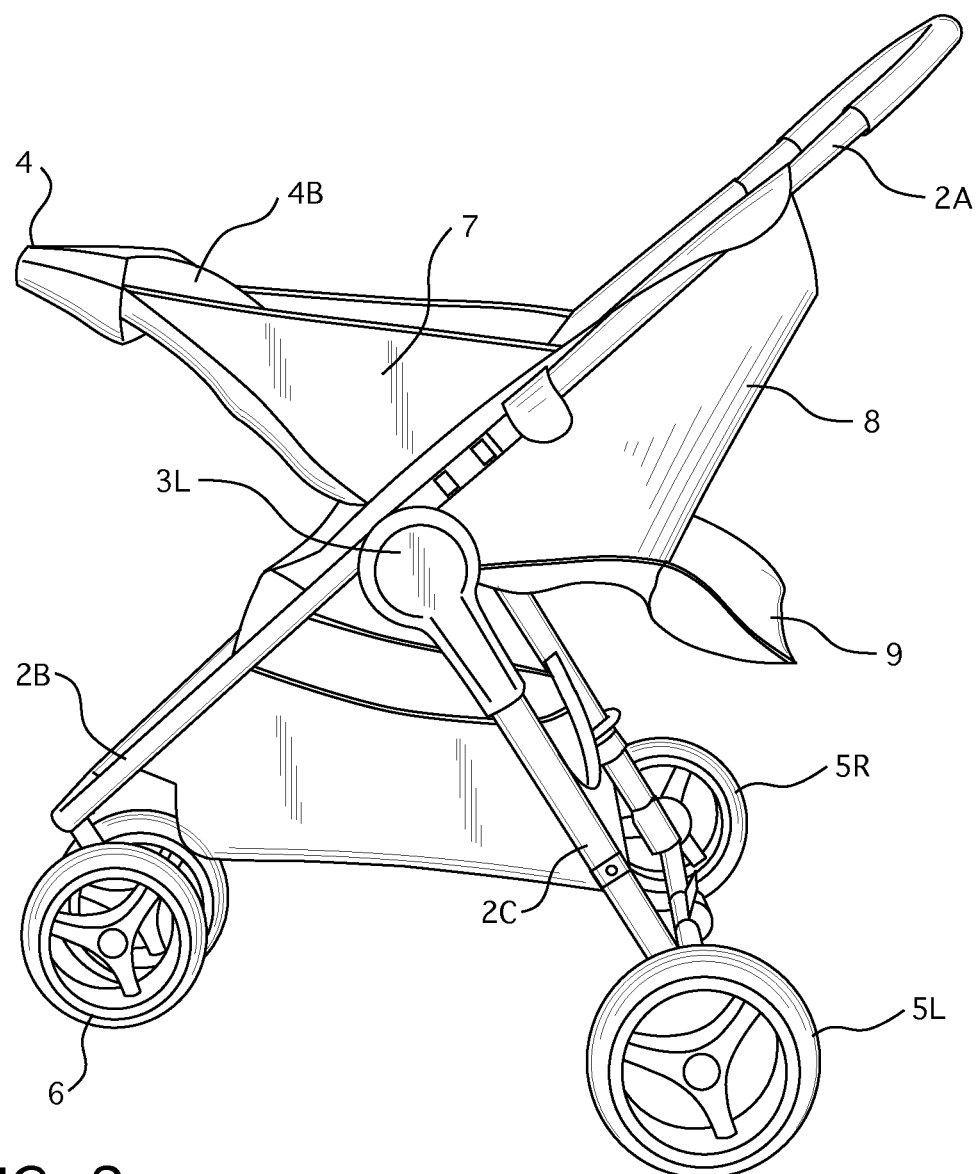
FIG. 2 depicts the embodiment of the stroller of FIG. 1 with the reversible seat back frame in the rearward facing position.

The embodiment of the stroller of FIG. 1 is shown in FIG. 2 with the seat backrest 4 in the rearward facing position. In the rearward facing position, a child may rest his back on the rearward seat backrest surface 4B. On the rearward facing position of the seat back 4, the rearward facing foot rest 9 is exposed and a child seated in the rearward facing position may rest their legs and/or feet on the rearward facing foot rest 9. The seat backrest 4 is connected to seat side flaps 7 and to the handle frame 2A. The flaps 7 form side walls for the seat back 4 in both the forward facing position (FIG. 1) and the rearward facing position (FIG. 2).

Figure 3:
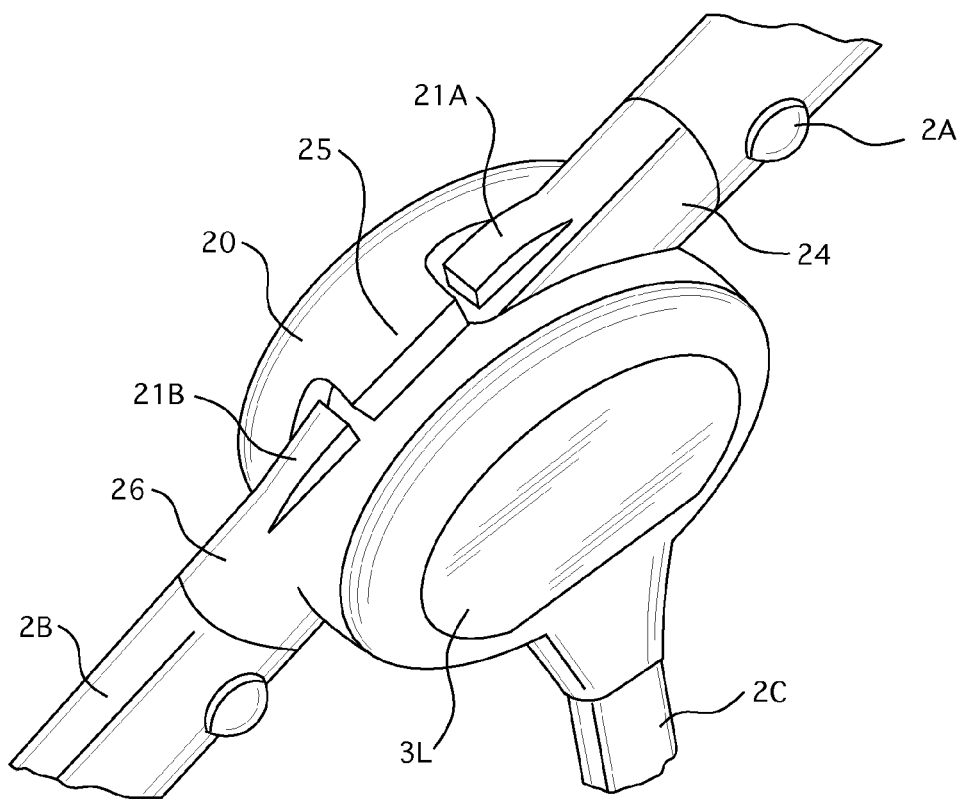
FIG. 3 depicts an enlarged exterior view of the folding mechanism of the embodiment of the stroller of FIG. 1.

FIG. 3 depicts an embodiment of folding mechanism 3L. In this embodiment, the folding mechanism 3L comprises a first rotatable member 24 connected to the handle frame member 2A and a second rotatable member 26 connected to front wheel frame member 2B. The folding mechanism 3L is fixedly connected to the rear wheel frame member 2C and rotatably connected to the handle frame 2A and rotatably connected to the front wheel support frame 2C. Also shown in FIG. 3 is the rotatable seat back bracket 20 of the seat back positioning assembly. The rotatable seat back bracket 20 comprises seat back positioning notches 29 (shown in FIGS. 6, 7, and 8, for example) and a locking tab 26. In the unfolded position (shown in FIGS. 1, 2, and 3), the locking tab 25 is sandwiched between the positioning tabs 21A 21B of the rotatable members 24 25. The positioning tab 21A is connected to rotatable member 24 and positioning tab 21B is connected to rotatable member 25. In the unfolded position, the rotatable seat back bracket 20 cannot rotate relative to the folding mechanism 3 or any of the frame members 2A, 2B and 2C.

FIG. 4 depicts a view the embodiment of the folding assembly 3L from the opposite side. The stroller frame 2 is again shown in the unfolded (in use) position with the handle frame 2A connected to the rotatable member 24 and front wheel support frame 2B connected to the rotatable member 25. The rotatable seat back bracket 20 comprise tab locking 25 that is sandwiched between positioning tab 21A and positioning tab 21B to prevent rotation of the rotatable seat back bracket 20 in the strollers unfolded (in use) position. Seat back frame 2D is rotatably connected to the rotatable seat back bracket 20 by pivot pin 27. In one embodiment, the seatback rest frame 2D, handle frame 2A, front wheel support frame 2B, and rear wheel support frame 2C all rotate around the same pivot axis. Further, the seat back assembly comprises a sliding sleeve 28 that is slidingly connected to the seat back frame 2D and may move from a seat backrest locked position to a seat backrest unlocked position. The sliding sleeve 28 comprises a locking pin 22 that may be received within the seat back positioning notches 29. The locking pin may be moved out of the seat back notches 29 defined in the rotatable seat back bracket 20 by use of a pulling or pushing mechanism or other movement assembly.

Figure 7:
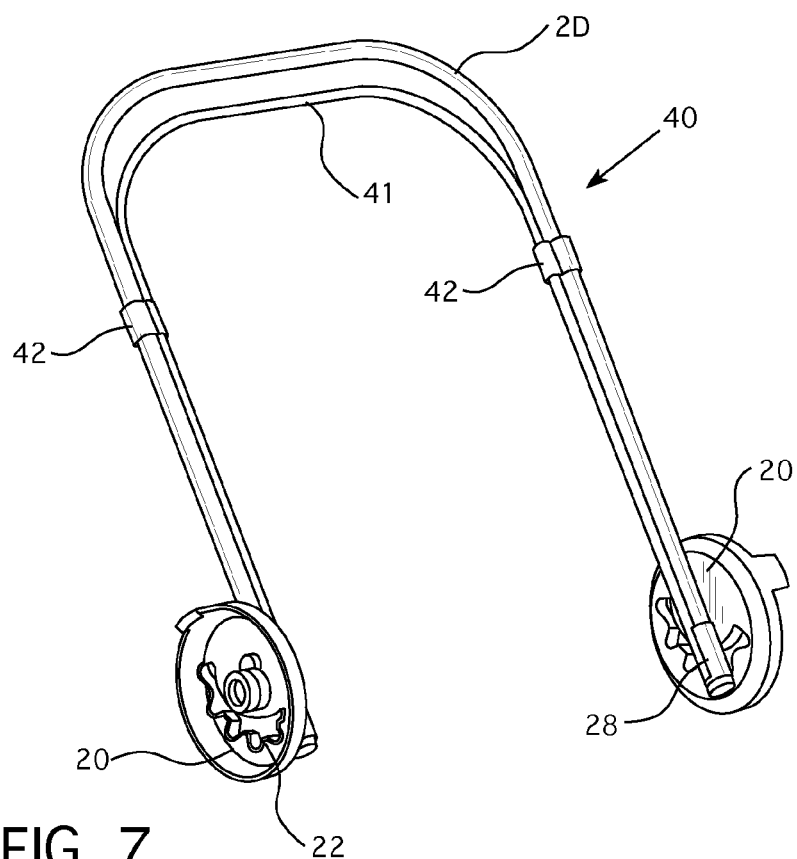
FIG. 7 depicts a perspective view of the embodiment of the rotatable seat back bracket of FIG. 6 with the reversible seat back frame rotatably connected to the rotatable seat back bracket.

For example, FIG. 7 depicts one embodiment of the seat backrest release mechanism 40. The seat back release mechanism 40 shown in FIG. 7 comprises a pull bar 41 slidingly connected to the seat back frame 2D by two guides 42. A bottom end of the pull bar is connected to the sliding sleeve 28. As the pull bar 41 is pulled back toward the seat back frame 2D and through guides 42, the bottom end of the pull bar 41 moves the sliding sleeve 28 and locking pin 22 out of one of the notches 29 defined in the rotatable seat back bracket 20 (See FIG. 6). The seat back frame 20 may then be pivoted on pivot pin 27 to align with another seat back positioning notch 29. When the pull bar 41 is released, a spring (not shown) or other biasing means within the seat back frame 2D biases the locking pin 22 back into a seat back positioning notch 29 at the new desired position.

Figure 8:
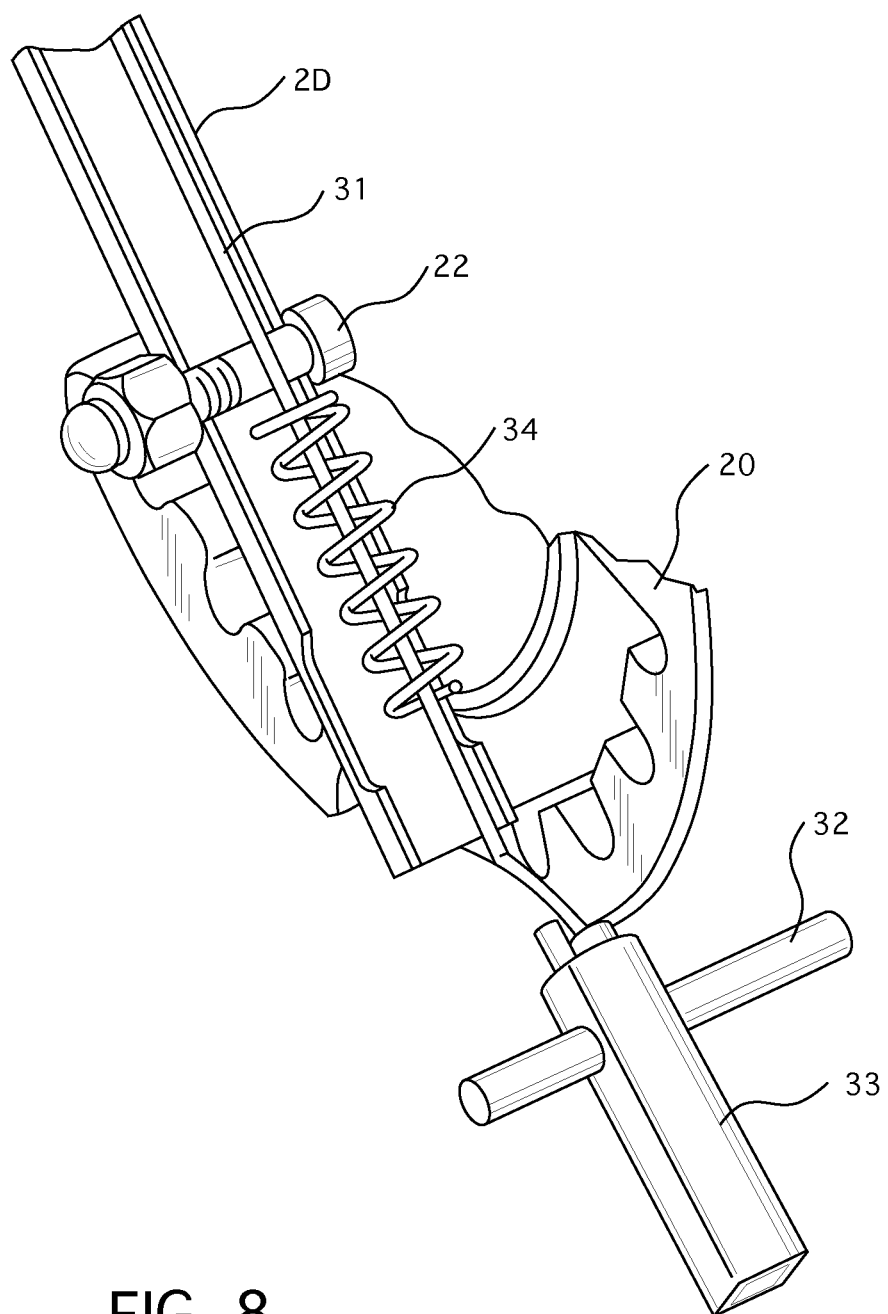
FIG. 8 depicts some of the components of the embodiment of the rotatable seat back bracket of FIG. 6.

Another embodiment of a seat back release mechanism is shown in FIG. 8. The seat back frame 2D is connected by a pivot pin 22 to the rotatable seat back bracket 20 with the seat back positioning notches 29. In this embodiment, sliding sleeve 33 is internal to the seat backrest frame 2D (not shown in position for clarity) and comprises a locking pin 32 that may be received with the seat back notches 29 defined on the seat back bracket 20. A pull bar may be connected to the sliding sleeve 33 by a pull wire 31. The pull bar or other release mechanism may then be manipulated to remove the locking pin 32 from the seat back positioning notches 29.

In this embodiment, a back rest spring 34 may be located between the pivot pin 22 and the sliding sleeve 33. The back rest spring 34 biases the sliding sleeve 33 and the locking pin 32 into the locking position wherein the locking pin 32 is received with a back rest positioning notch 29. The biasing force of the back rest spring 34 may be overcome by pulling the pull bar and thus pulling the pull wire 31.

An embodiment of the seat back adjustment mechanism further comprises an automatic release mechanism for removing the locking pin 22 or 32 from the seat back positioning notches 29. In one embodiment, the automatic release mechanism comprises a locking pin 22 (or 32) removal component that urges the locking pin 22 out the intermediate seat back positioning notches 29I and allows the locking pin 22 to rotate to an end seat back locking notch 29E while the strode is moved from the unfolded (in use) position to the folded (storage position, see FIG. 11). A frame locking mechanism may be released to allow relative rotation of the frame members of the stroller to move from the unfolded position to the folded position.

In embodiments of stroller, as the stroller is unlocked from the unfolded in-use configuration, the locking tab 25 is released from being sandwiched between the positioning tabs 21A 21B of the rotatable members 24 25 as the rotatable members 24 25 are rotated in opposite directions toward the folded position. This allows the rotatable seat back bracket 20 to freely rotate in either rotational direction. As the rotatable seat back bracket 20 rotates the locking pin 22 is urged out of the intermediate seat back positioning notches 29I to rotate into the end seat back positioning notches 29E. The locking mechanism 3 comprises an internal notch blocking member 35 wherein the internal notch blocking member 35 blocks locking pin 22 from entering or remaining within the intermediate seat back positioning notches 29I during the folding process.

The first embodiment of the automatic release mechanism comprises a rotatable seat back bracket 20 that is locked in place by the rotatable members 24 25 when the stroller is unfolded. In the unfolded configuration, the back rest frame 2D can be repositioned by pulling the pull bar 41 to release a locking pin 22 from one of the backrest positioning notches 29 and relocate the backrest pin into another notch 29. There are sufficient notches that the backrest may be angled backward for a forward seated child or angled forward for a backward facing child.

When the frame locking mechanism for the stroller is released, the locking pin 22 or 32 is knocked out of the intermediate seat back position notches 29I so that the locking pin 22 or 32 is urged to either the furthest forward notch or the furthest backward notch 29E. The seat back frame 2D and thus the rotatable seat back bracket 20 may be urged to rotate together by the force of gravity or other biasing force. The rotatable seat back bracket 20 with the notches 29 freely rotates into the folded position (shown in FIG. 11) with the back rest frame 2D. When the stroller is subsequently unfolded, the rotatable seat back bracket 20 is again sandwiched between the two rotating members 24 25 and locked into its in use position as shown in FIGS. 1, 2 and 3, for example. The back rest frame 2D rotates with the rotatable back rest bracket 20 into either the most forward or most backward position depending on the position of the back rest frame 2D at the time the stroller was folded. The user can then adjust the back rest frame 2D from this location to the desired location as described above.

Figure 9:
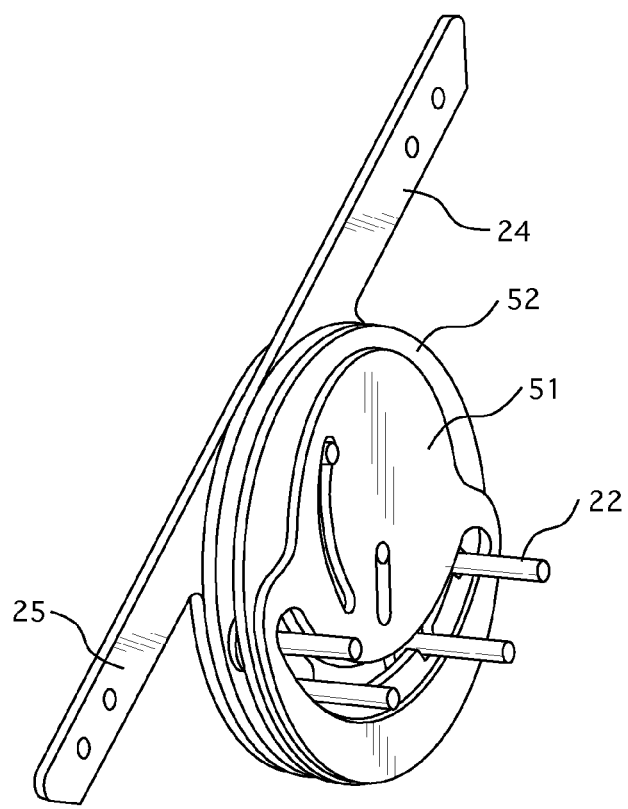
FIG. 9 depicts additional components of the embodiment of the rotatable seat back bracket of FIG. 6 and the folding mechanism.
Figure 10:
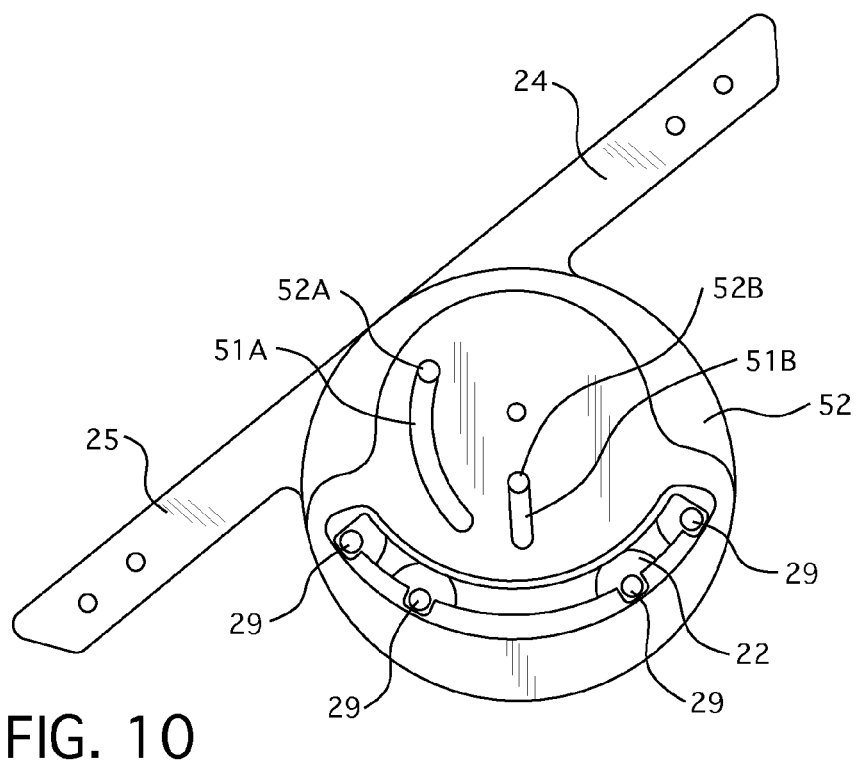
FIG. 10 depicts the components of the embodiment of the rotatable seat back bracket of FIG. 6.

A second embodiment of the automatic release mechanism is shown in FIGS. 9 and 10. In this embodiment, the automatic release mechanism comprises an internal notched plate 52 and an internal slotted plate 51. A folding mechanism housing encompasses the internal notched plate 52 and an internal slotted plate 51 and includes an aperture that allows the locking pin 22 to be received with the notches 29. During the folding process, the internal notched plate 52 and the internal slotted plate 51 rotate relative to each other eccentrically. The eccentric rotation is the result of the forced paths resulting from the pin 52A traveling in curved groove 51A and pin 52B within linear aperture 51B. The resulting eccentric rotation results in internal notched plate 52 moving behind the internal slotted plate 51 to push locking pin 22 out of notches 29 as the notches 29 moves behind a wall of the internal notched plate 52. After the locking pin 22 is push out of the notches 29 the seat rest frame 2D may rotate freely into the folded position as shown in FIG. 11. As the stroller is again unfolded, the internal notched plate 52 and the internal slotted plate 51 rotate eccentrically in the reverse direction to again expose the notches 29 to receive the locking pin 22 and allow fixing and adjusting the seat back frame 2D into the desired position.

FIG. 11 shows the stroller in the folded position. The folding mechanism in this embodiment allows the handle frame 2A to be rotated to be folded in one rotational direction to be located adjacent to the rear wheel frame 2C. The front wheel frame 2B rotates in an opposite direction to be located adjacent to another side of the rear wheel frame 2C. The automatic release mechanism of the folding mechanism allows the seat back frame 2D to be released from its positioning notch 29 to also rotate adjacent to the rear wheel frame 2C to provide a compactly folded stroller. In the embodiment shown in FIG. 11, the seat back frame 2D has rotated within the width of the handle frame 2A.

Figure 12A:
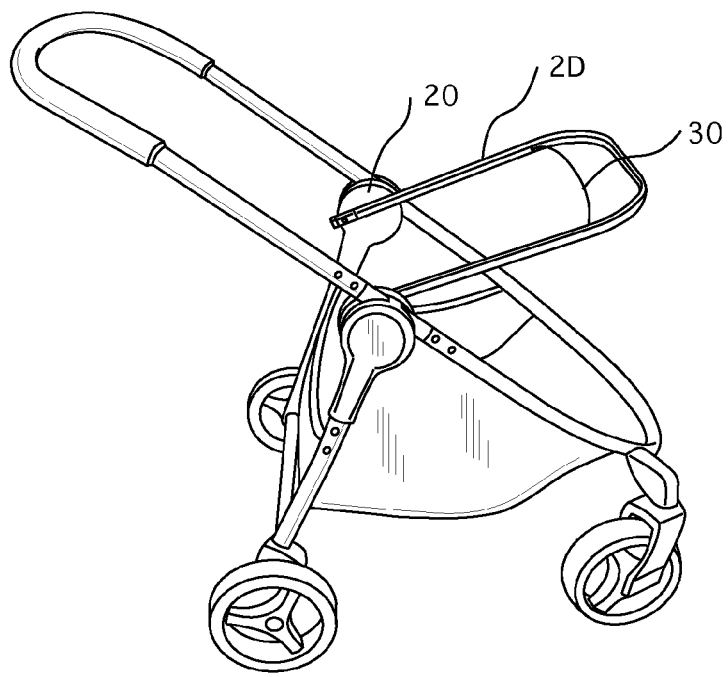
FIG. 12A depicts the embodiment of the stroller of FIG. 1 with the reversible seat back frame in a fully reclined rearward facing position.
Figure 12B:
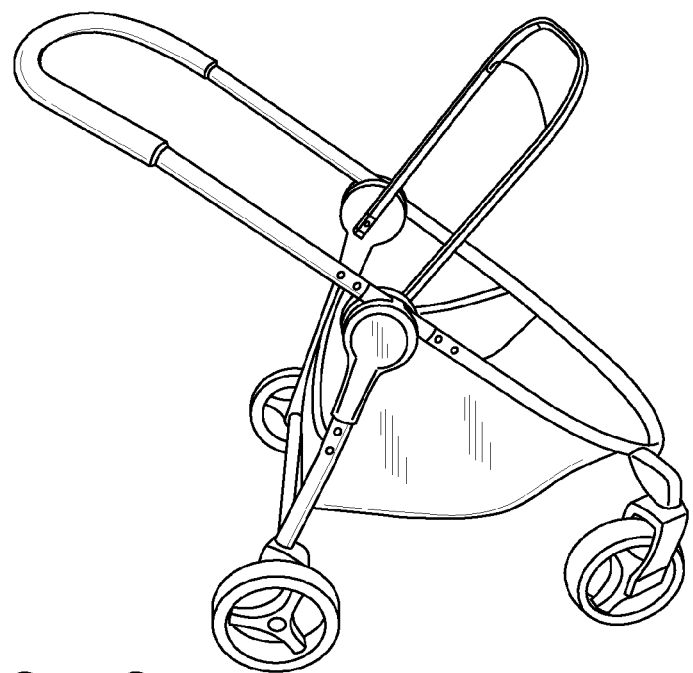
FIG. 12B depicts the embodiment of the stroller of FIG. 1 with the reversible seat back frame in a typical rearward facing position.
Figure 12C:
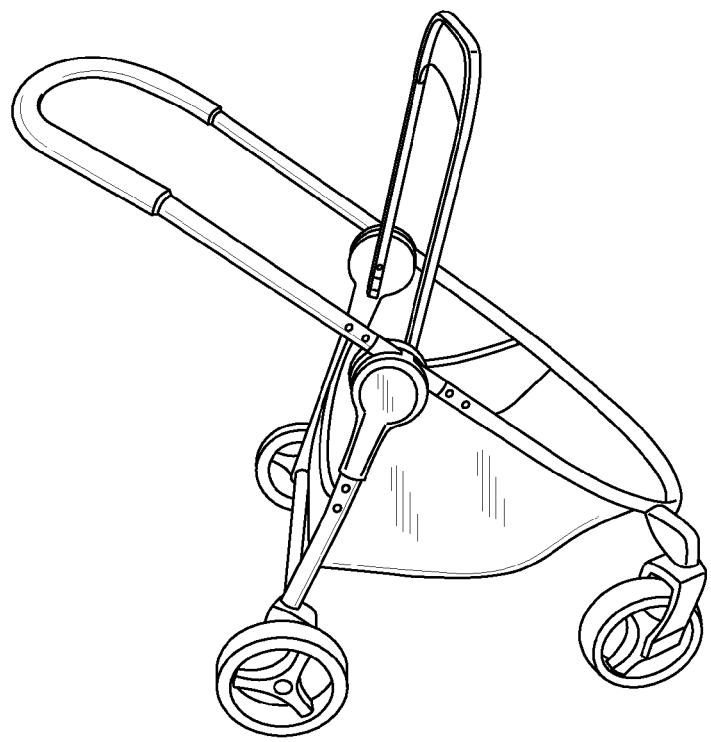
FIG. 12C depicts the embodiment of the stroller of FIG. 1 with the reversible seat back frame in an upright rearward facing position.
Figure 12D:
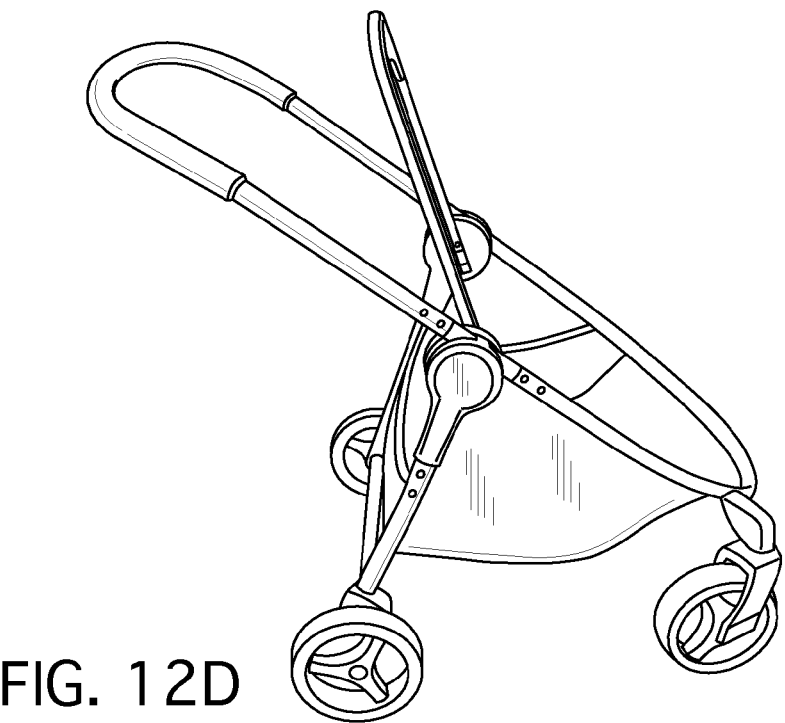
FIG. 12D depicts the embodiment of the stroller of FIG. 1 with the reversible seat back frame in an upright forward facing position.
Figure 12E:
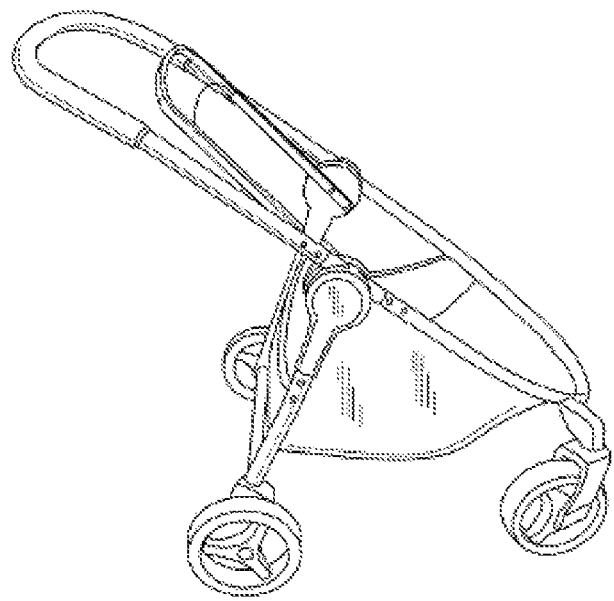
FIG. 12E depicts the embodiment of the stroller of FIG. 1 with the reversible seat back frame in a reclined forward facing position.
Figure 12F:
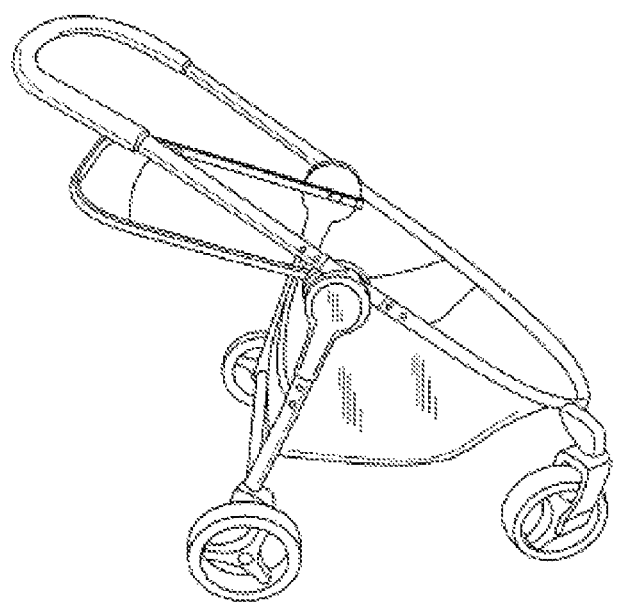
FIG. 12F depicts the embodiment of the stroller of FIG. 1 with the reversible seat back frame in a fully reclined forward facing position.

FIGS. 12A to 12F show embodiments of the stroller with the seat back frame 2D in various positions from a furthest forward angled position for rearward facing position (FIG. 12A) to a furthest rearward angled position for forward facing position (FIG. 12F). FIG. 12A depicts the embodiment of the stroller of FIG. 1 with the reversible seat back frame in a fully reclined rearward facing position. FIG. 12B depicts the embodiment of the stroller of FIG. 1 with the reversible seat back frame in a typical rearward facing position. The stroller seat backrest frame may also be secured in various reclining positions in both the forward facing position and the rearward facing position. For example, FIG. 12C depicts the embodiment of the stroller of FIG. 1 with the reversible seat backrest frame in an upright rearward facing position, FIG. 12D depicts the embodiment of the stroller of FIG. 1 with the reversible seat backrest frame in an upright forward facing position. FIG. 12E depicts the embodiment of the stroller of FIG. 1 with the reversible seat backrest frame in an intermediate reclining forward facing position and FIG. 12F depicts the embodiment of the stroller of FIG. 1 with the reversible seat backrest frame in a fully reclined forward facing position.

Figure 13:
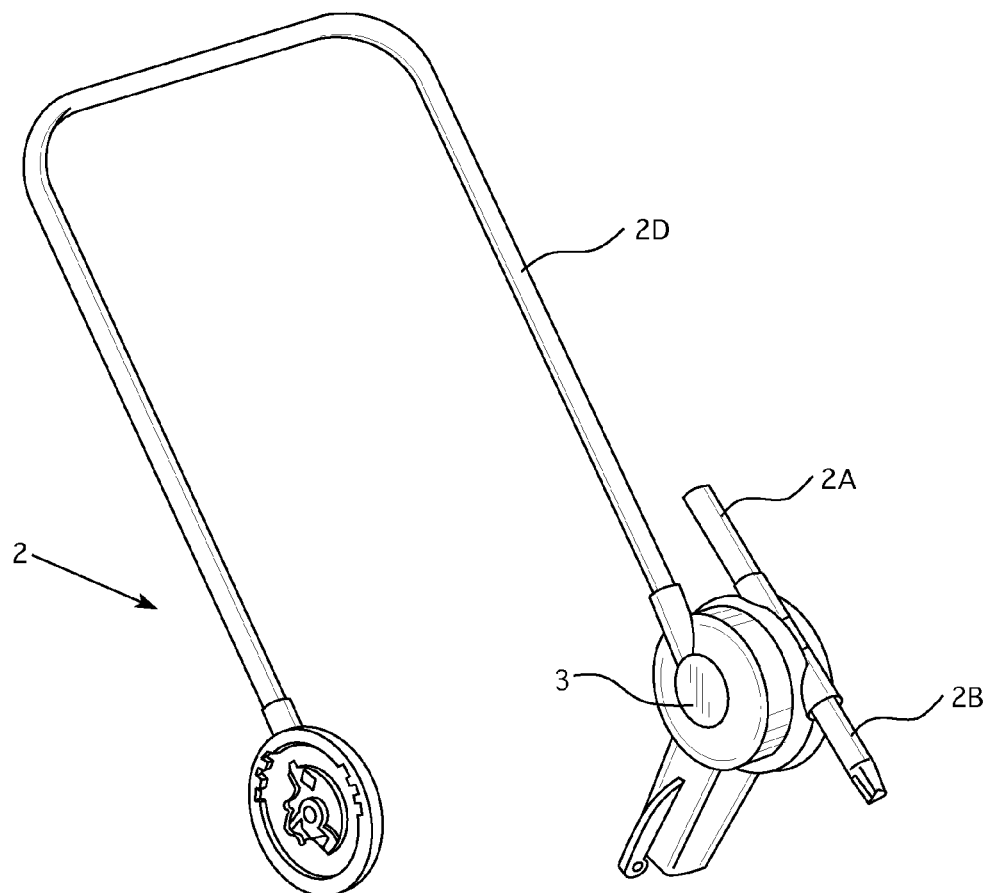
FIG. 13 depicts another embodiment of the seat backrest mechanism for locking the seat back frame in the various positions in the forward and rearward positions.

As another example of a seat back rest locking mechanism, a portion of an embodiment of a stroller comprising a reversible seat back is shown in FIG. 13. In the embodiment of the stroller shown in FIG. 13, the stroller comprises a handle frame 2A, a front wheel frame 2B, a rear wheel support frame 2C, and a reversible seat back frame 2D. The front wheel frame 2B is rotatably connected to at least one front wheel, the rear wheel support frame 2C is rotatably connected to at least one rear wheel and the handle frame 2B comprises a grip for pushing the stroller.

In the embodiment shown in FIG. 13, the handle frame 2A, the front wheel frame 2B, the rear wheel support frame 2C and the reversible seat back frame 2D are connected to a folding mechanism 3 that is capable of locking the frame members in a folded storage position and an unfolded in-use position and releasing the frame members to rotate about a pivot axis to the folded storage position. In this embodiment, the handle frame 2A, the front wheel frame 2B, and the rear wheel support frame 2C all rotate about the same rotational axis from the folded configuration to the unfolded configuration. The reversible seat back frame 2D (shown in FIG. 13 in the forward facing position) may be adjusted to a plurality of forward facing positions and a plurality of rearward facing positions. The reversible seat backrest frame 2D rotates about the same rotational axis as the other frame members are adjusted to the plurality of forward facing positions and a plurality of rearward facing positions.

Figure 14:
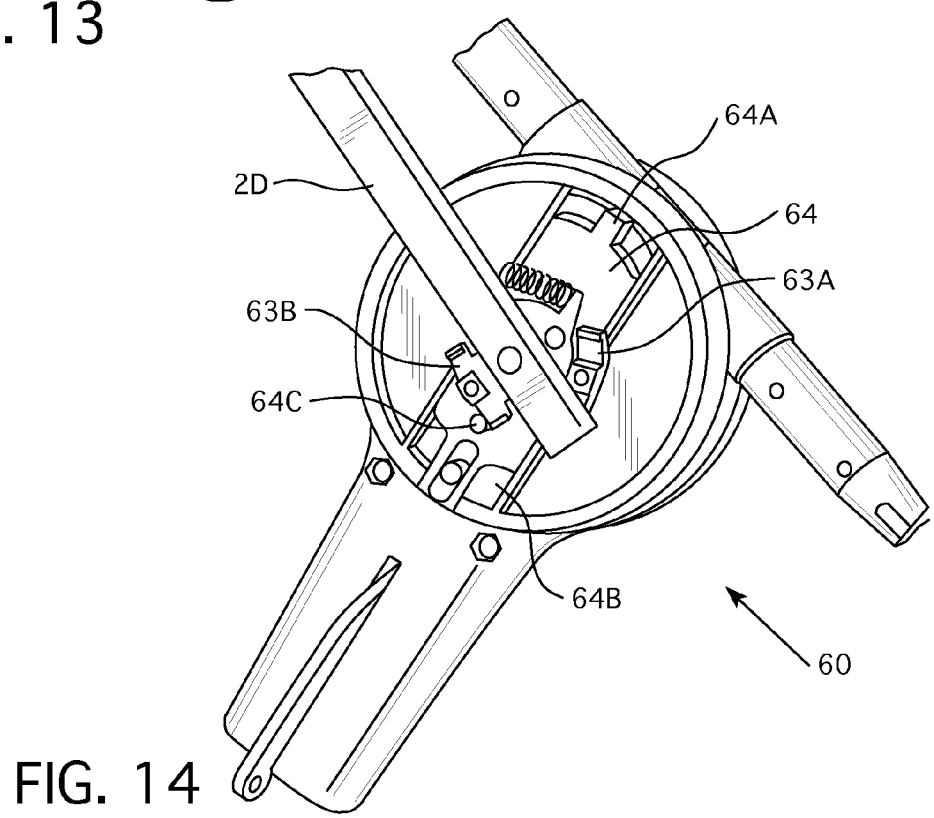
FIG. 14 depicts a view of the internal structure of the embodiment of the seat backrest mechanism shown in FIG. 13.

FIG. 14 depicts an enlarged internal view of an embodiment of a seat backrest support assembly 60. The seat backrest support assembly 60 comprises a seat backrest frame 2D and a backrest locking mechanism. The seatback frame 2D may be adjusted to lock in a plurality of positions including positions with the seat back angled backward for the child to have a forward facing position and positions with the seat back angled forward for a child to have a rearward facing position while the stroller is in the unfolded position. In the embodiment shown in FIGS. 14 and 15, the seatback frame 2D may be adjusted in three forward facing positions by adjusting the backrest frame 2D such that the locking member 64 may be inserted in any of the recesses 66A, 66B or 66C. Similarly, the seatback frame 2D may be adjusted in three rearward facing positions by adjusting the backrest frame 2D such that the locking member 64 may be inserted in any of the recesses 66A, 66B or 65C.

For example, the backrest locking mechanism may comprise a locking member 64 moveable from a locked position wherein the locking member 64 engages a stop (for example, recess 66A) to an unlocked position wherein the locking member 64 does not engage a stop and may be rotated relative to the handle frame 2D. The locking member 64 is moveable linearly within a channel 64B defined within the housing of the seatback locking assembly.

Figure 15:
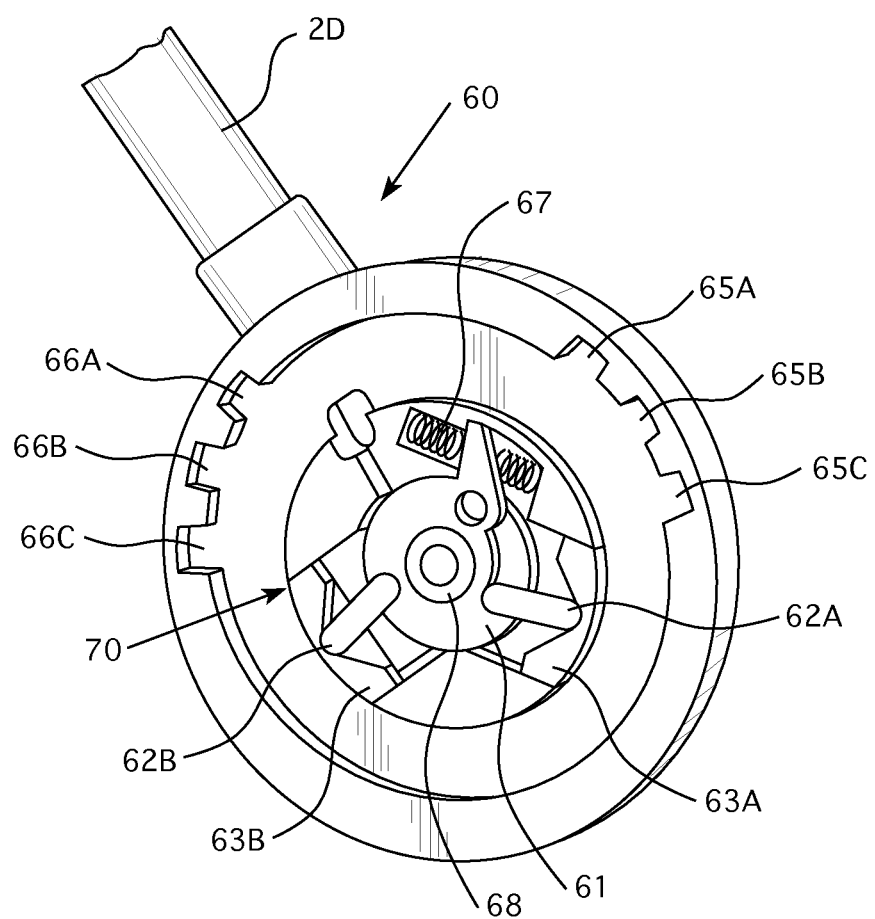
FIG. 15 depicts anther view of the internal structure of the embodiment of the seat backrest mechanism shown in FIG. 13.

The backrest locking assembly of FIGS. 14 and 15 may comprise a slider crank mechanism for releasing the locking member 64 to allow adjustment of the seat backrest frame 2D. The slider crank mechanism converts rotational motion into linear motion. A central rotating disk 61 is connected to a linearly moveable component by a connecting rod 62A and 62B. The backrest locking assembly of FIG. 15 comprises a first position wherein the slider crank mechanism biases the locking member to the locked position and a second position wherein slider crank mechanism is in the unlocked position. The slider crank mechanism comprises a pivot pin 68 and a central disk 61 rotatably mounted on the pivot pin 68. The central disk 61 is biased to rotate toward a connecting rod 62A and 62B extended position. The central disk 61 may be biased by any biasing mechanism such as, but not limited to, spring 67, for example. In the slider crank mechanism, the first connecting rod 62A is rotatably connected at a proximal end to the central disk 61. The first connecting rod 62A is also connected at a distal end to a first sliding component 63A. As such, the first sliding component 63A engages the locking member 64 with the seat backrest frame 2D in the rearward facing position when the central disk 61 is rotated to the locked position. In the embodiment shown in FIGS. 14 and 15, the first sliding component 63A extends through the housing to engage a post 640 on the locking member 64. The central disk 61 is biased to a position wherein the locking mechanism is engaged with a stop 65A, for example, to lock the backrest frame 2D at a rearward facing upright position.

In embodiments of the stroller wherein the backrest frame 20 may be locked in either a forward facing position or a rearward facing position, the slider crank mechanism may also comprise a second connecting rod 62B rotatably connected at a proximal end to the central disk 61. The second connecting rod 62B is also connected at a distal end to a first sliding component 63B. The second sliding component 63B may engage the locking member 64 with the seat backrest frame 2D in the forward facing position to push the locking member 64 into the locked position. In the embodiment shown in FIGS. 14 and 15, the second sliding component 63A extends through the housing to engage a post 64C on the locking member 64 with the backrest frame 2D in the forward facing position. In an embodiment of the backrest locking assembly with first and second sliding components 63A and 63B, one of the sliding components engage the locking member in the forward facing position and the other of the sliding components engage the looking member in the rearward facing position.

The backrest locking assembly may further comprise a release mechanism for exerting a force opposed to the biasing force exerted by the biasing mechanism to move the slider crank mechanism into the unlocked position. The release mechanism may comprise a release wire connected to the rotating disk of the slider crank mechanism. The release wire is connected at the other end to a pulling assembly that pulls the central disk to rotate the central disk against the force exerted by the biasing mechanism.

The backrest locking mechanism may comprise a first locking stop and a second locking stop. The stops define the positions that the backrest may be locked. In specific embodiments for a reversible backrest, the seat backrest frame comprises at least two locked positions, a first position wherein a child seat connected to the backrest frame is in a forward facing position and a second position wherein the child seat is in a rearward facing position. The backrest locking mechanism may comprise additional stops. For example, the backrest locking mechanism may have additional stops to adjust the reclining angle of the seat backrest may have a plurality of stops in the forward facing position, such as stops for a horizontal or near horizontal position and/or a vertical or near vertical position. There may be additional stops intermediate of these positions in the forward facing position, also. The rearward facing position of the seat backrest may also have additional stops for adjusting the reclining position of the seat backrest frame. The embodiment of the seat backrest locking mechanism of FIG. 15 has six recesses 65A, 65B, 65C, 66A, 66B, 66C in the housing of the backrest locking assembly that are stops for receiving the pin 64A of the locking member 64.

Other aspects and features of embodiments of the strollers will become apparent to those of ordinary skill in the art, upon reviewing the following description of specific, exemplary embodiments of the present invention in concert with the figures. While features may be discussed relative to certain embodiments and figures, all embodiments can include one or more of the features discussed herein. While one or more particular embodiments may be discussed herein as having certain advantageous features each of such features may also be integrated into various other of the embodiments of the invention (except to the extent that such integration is incompatible with other features thereof) discussed herein. In similar fashion, while exemplary embodiments may be discussed below as system or method embodiments it is to be understood that such exemplary embodiments can be implemented in various systems and methods.

The embodiments of the described methods and stroller are not limited to the particular embodiments, method steps, and materials disclosed herein as such formulations, process steps, and materials may vary somewhat. Moreover, the terminology employed herein is used the purpose of describing exemplary embodiments only and the terminology is not intended to be limiting since the scope of the various embodiments of the present invention be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

The invention claimed is:

1. A stroller frame with a reversible backrest, comprising:
   a handle frame comprising a first end comprising a handle for the stroller and a distal second end;
   a rear wheel support frame comprising a first rear frame end and a distal second rear frame end, the first rear frame end comprising at least one rear wheel movably coupled thereto;
   a front wheel support frame comprising a first front frame end and a distal second front frame end, the first front frame end movably coupled to at least one front wheel;
   wherein one of the second end of the handle frame, second rear frame end of the rear wheel support frame, and second front frame end of the front wheel support frame support a pivot defining a pivot axis and the two other of the second end of the handle frame, second rear frame end of the rear wheel support frame, and second front frame end of the front wheel support frame are rotatably connected to rotate about the pivot axis from a folded position to an unfolded position; and
   a seat backrest support frame for a child seat, wherein the backrest support frame is rotatably connected to rotate about the pivot axis relative to the handle frame, rear wheel support frame, and front wheel support frame from a position wherein the child seat is in a forward facing position to a second position wherein the child seat is in a rearward facing position.

2. The stroller frame of claim 1, comprising: a folding mechanism configured to lock the stroller frame in an unfolded, in-use position.

3. The stroller frame of claim 1, comprising:
   a backrest locking mechanism, wherein the backrest locking mechanism comprises:
      at last one first locking stop and at least one second locking stop; and
      a locking member movable from a locked position, wherein the locking member engages at least one of the locking stops, to an unlocked position, wherein the locking member does not engage a locking stop;
   a slider crank mechanism comprising a first position, wherein the slider crank mechanism biases the locking member to the locked position, and a second position, wherein slider crank mechanism is in the unlocked position;
   a biasing mechanism connected to the slider crank mechanism to apply a biasing force to maintain the slider crank mechanism in the locked position; and a release mechanism for exerting a force opposed to the biasing force to move the slider crank mechanism into the unlocked position.

4. The stroller frame of claim 3, wherein the seat backrest support frame comprises at least two locked positions, a first locked position wherein a child seat connected to the seat backrest support frame is in a forward facing position and a second locked position wherein the child seat is in a rearward facing position.

5. The stroller frame of claim 3, wherein the slider crank mechanism comprises:
   a first connecting rod for locking the seat backrest support frame in the first position; and
   a second connecting rod for locking the seat back rest frame in the second position.

6. The stroller frame of claim 3, wherein the slider crank mechanism comprises:
   a pivot pin;
   a central disk rotatably mounted on the pivot pin;
   a first connecting rod rotatably connected to the central disk;
   a first sliding component rotatably connected to the first connecting rod, wherein the first sliding component engages the locking member with the seat backrest support frame in the first position;
   a second connecting rod rotatably connected to the central disk; and
   a second sliding component rotatably connected to the second connecting rod, wherein the second sliding component engages the locking member with the seat backrest support frame in the second position.

7. The stroller frame of claim 6, wherein the locking member is a pin and the locking stops are recesses defined in a housing of the seat backrest support frame.

8. The stroller frame of claim 3, wherein the release mechanism comprises a release wire and the release wire extends through a tube of the handle frame.

9. The stroller frame of claim 6, wherein the release mechanism comprises a release wire and wherein the release wire is connected to the central disk and a wire pulling assembly.

10. A stroller, comprising:
    a handle frame comprising a first end comprising a handle for the stroller and a distal second end;
    a rear wheel support frame comprising a first rear frame end and a distal second rear frame end, the first rear frame end comprising at least one rear wheel movably coupled thereto;
    a front wheel support frame comprising a first front frame end and a distal second front frame end, the first front frame end movably coupled to at least one front wheel;
    wherein one of the second end of the handle frame, second rear frame end of the rear wheel support frame, and second front frame end of the front wheel support frame support a pivot defining a pivot axis and the two other of the second end of the handle frame, second rear frame end of the rear wheel support frame, and second front frame end of the front wheel support frame are rotatably connected to rotate about the pivot axis from a folded position to an unfolded position;
    a seat backrest frame rotatably connected to rotate about the pivot axis relative to the handle frame, rear wheel support frame, and front wheel support frame;
    a backrest locking mechanism, wherein the backrest locking mechanism comprises:
        at least one first locking stop and at least one second locking stop; and
        a locking member moveable from a locked position wherein the locking member engages at least one of the locking stops to an unlocked position wherein the locking member does not engage a stop;
        a slider crank mechanism comprising a first position wherein the slider crank mechanism biases the locking member to the locked position and a second position wherein slider crank mechanism is in the unlocked position;
        a biasing mechanism connected to the slider crank mechanism to apply a biasing force to maintain the slider crank mechanism in the locked position; and
        a release mechanism for exerting a force opposed to the biasing force to move the slider crank mechanism into the unlocked position.

11. The stroller of claim 10, wherein the seat backrest frame comprises at least two locked positions, a first locked position wherein a child seat connected to the seat backrest frame is in a forward facing position and a second locked position wherein the child seat is in a rearward facing position.

12. The seat backrest support assembly of claim 11, wherein the slider crank mechanism comprises:
    a first connecting rod for locking the seat backrest frame in the first locked position; and
    a second connecting rod for locking the seat backrest frame in the second locked position.

13. The stroller of claim 11, wherein the slider crank mechanism comprises:
    a pivot pin;
    a central disk rotatably mounted on the pivot pin;
    a first connecting rod rotatably connected to the central disk;
    a first sliding component rotatably connected to the first connecting rod, wherein the first sliding component engages the locking member with the seat backrest frame is in the first locked position;
    a second connecting rod rotatably connected to the central disk; and
    a second sliding component rotatably connected to the second connecting rod, wherein the second sliding component engages the locking member with the seat backrest frame is in the second locked position.

14. The stroller of claim 13, wherein the locking member is a pin and the locking stops are recesses defined in a housing of the seat backrest frame.

15. The stroller of claim 10 wherein the release mechanism comprises a release wire.

16. The stroller of claim 15, wherein the release wire is connected to the central disk.

17. A stroller frame with a reversible backrest, comprising:
    a handle frame;
    a rear wheel support frame;
    a front wheel support frame; wherein one of the handle frame, rear wheel support frame, and front wheel support frame support a pivot defining a pivot axis and the two other of the handle frame, rear wheel support frame, and front wheel support frame are rotatably connected to rotate about the pivot axis from a folded position to an unfolded position;
    a seat backrest support frame for a child seat, wherein the backrest support frame is rotatably connected to rotate about the pivot axis from a position wherein the child seat is in a forward facing position to a second position wherein the child seat is in a rearward facing position
    a backrest locking mechanism comprising:

at last one first locking stop and at least one second locking stop;

a locking member movable from a locked position, wherein the locking member engages at least one of the locking stops, to an unlocked position, wherein the locking member does not engage a locking stop;

a slider crank mechanism comprising:

a pivot pin;

a central disk rotatably mounted on the pivot pin;

a first connecting rod rotatably connected to the central disk;

a first sliding component rotatably connected to the first connecting rod, wherein the first sliding component engages the locking member with the seat backrest support frame in the first position;

a second connecting rod rotatably connected to the central disk; and a second sliding component rotatably connected to the second connecting rod, wherein the second sliding component engages the locking member with the seat backrest support frame in the second position.

\* \* \* \* \*